US012700688B2

(12) United States Patent
Raybold

(10) Patent No.: US 12,700,688 B2
(45) Date of Patent: Aug. 4, 2026

(54) FLAT FLEXIBLE CABLE CONNECTOR

(71) Applicant: TE Connectivity Solutions GmbH, Schaffhausen (CH)

(72) Inventor: Christopher Ryan Raybold, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 774 days.

(21) Appl. No.: 18/166,113

(22) Filed: Feb. 8, 2023

(65) Prior Publication Data

US 2024/0266767 A1 Aug. 8, 2024

(51) Int. Cl.

| | |
|---|---|
| ***H01R 12/79*** | (2011.01) |
| ***H01R 13/502*** | (2006.01) |
| ***H01R 13/627*** | (2006.01) |
| ***H01R 13/629*** | (2006.01) |

(52) U.S. Cl.

CPC ........... *H01R 12/79* (2013.01); *H01R 13/502* (2013.01); *H01R 13/6271* (2013.01); *H01R 13/629* (2013.01)

(58) Field of Classification Search

CPC .. H01R 12/79; H01R 13/502; H01R 13/6271; H01R 13/629; H01R 12/774; H01R 13/15; H01R 12/778; H01R 13/40; H01R 13/02; H01R 13/639

See application file for complete search history.

(56) References Cited

U.S. PATENT DOCUMENTS

| | | | | |
|---|---|---|---|---|
| 3,278,887 | A * | 10/1966 | Lawrence | H01R 12/778 216/13 |
| 6,558,186 | B1 * | 5/2003 | LePottier | H01R 12/79 439/495 |
| 6,755,683 | B2 * | 6/2004 | Roberts | H01R 12/79 439/496 |
| 11,489,279 | B2 * | 11/2022 | Myer | H01R 12/7023 |
| 11,527,845 | B2 * | 12/2022 | Myer | H01R 4/2404 |
| 11,557,858 | B2 * | 1/2023 | Hetrick | H01R 13/501 |
| 12,237,596 | B2 * | 2/2025 | Raybold | H01R 13/629 |
| 12,407,130 | B2 * | 9/2025 | Shanbhag | H01R 12/771 |
| 2024/0266767 | A1 * | 8/2024 | Raybold | H01R 12/79 |

* cited by examiner

*Primary Examiner* — Abdullah A Riyami
*Assistant Examiner* — Nader J Alhawamdeh

(57) ABSTRACT

A connector assembly includes a connector body defining an opening in communication with a cable space, and a cable insertion device insertable into the cable space of the connector body. Conductive contact surfaces of the connector are located on opposing sides of the cable space. The cable insertion device includes a body defining at least one elastic section, a first cable locating element arranged on a first side of the body, and a second cable locating element arranged on a second side of the body.

23 Claims, 6 Drawing Sheets

FLAT FLEXIBLE CABLE CONNECTOR

FIELD OF THE INVENTION

The present invention relates to connectors, and more particularly, to connector systems for flat flexible cables or flat printed cables.

BACKGROUND

As understood by those skilled in the art, flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to traditional architectures. As a result, FFCs implemented in many complex and/or high-volume applications, including wiring harnesses, such as those used in automotive manufacturing. A critical obstacle preventing the implementation of FFCs into these applications includes the need to develop quick, robust, and low resistance termination and/or connectorization systems and techniques which enable the relatively fragile FFC to be mating with various components.

Accordingly, cost effective and reliable solutions for connectorizing FFC assemblies are desired.

SUMMARY

In one embodiment of the present disclosure a connector assembly includes a connector body defining an opening in communication with a cable space, and a cable insertion device insertable into the cable space of the connector. Conductive contact surfaces of the connector are located on opposing sides of the cable space. The cable insertion device includes a body defining at least one elastic section, a first cable locating element arranged on a first side of the body, and a second cable locating element arranged on a second side of the body.

BRIEF DESCRIPTION OF THE DRAWINGS

The invention will now be described by way of example with reference to the accompanying Figures, of which.

DETAILED DESCRIPTION OF THE EMBODIMENTS

Figure 1:
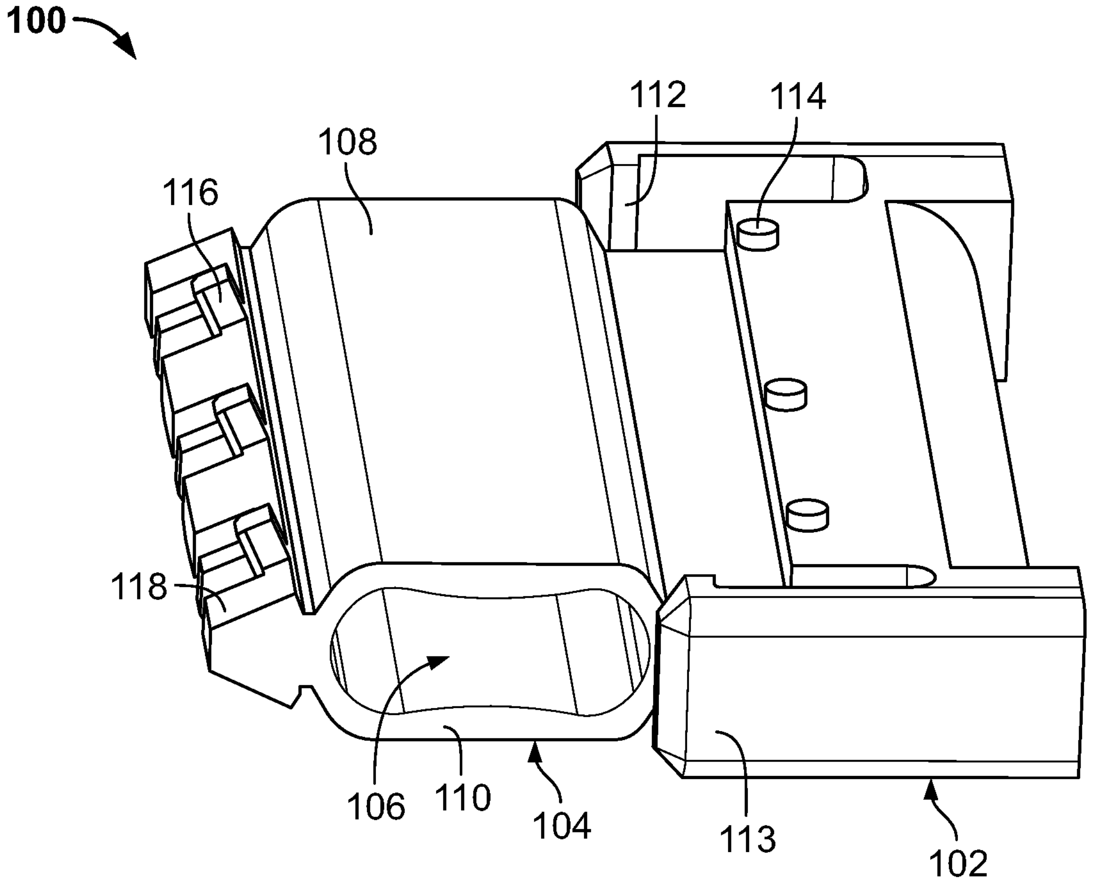
FIG. 1 is a perspective view of a cable insertion device according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include FFC connector assemblies which include a connector body defining a cable space, and a cable insertion device adapted to aid in the installation of at least one, and in preferred embodiments two, FFCs within the cable space. Cable insertion devices according to the present disclosure are used to apply and maintain contact force between exposed conductors of the FFCs and conductive contact surfaces of the connector located within the cable space.

Figure 2:
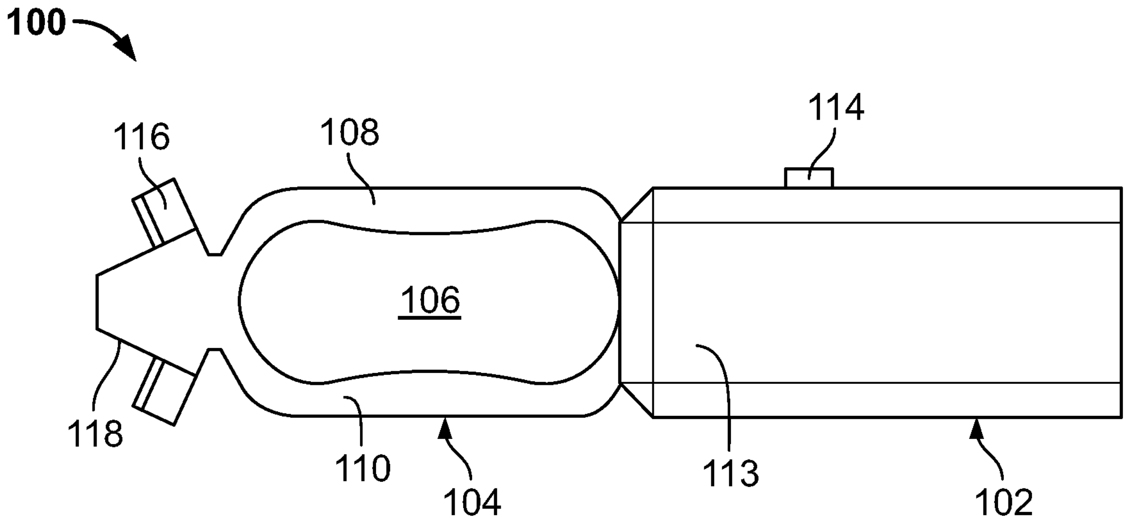
FIG. 2 is a side view of the cable insertion device of FIG. 1.

Referring generally to FIGS. 1 and 2, a cable insertion device 100 according to one embodiment of the present disclosure comprises a body (e.g., a monolithic polymer or plastic body) defining a latching section 102 formed generally rearward on the device, and elastic or spring section 104 arranged proximate a forward or insertion end of the device. The latching section 102 may include, by way of example only, two cantilevered latches 112,113 arranged on respective lateral sides of the device 100. The latches 112,113 are adapted to engage with corresponding locking features of a mating connector housing, as will be set forth in greater detail herein.

Figure 3:
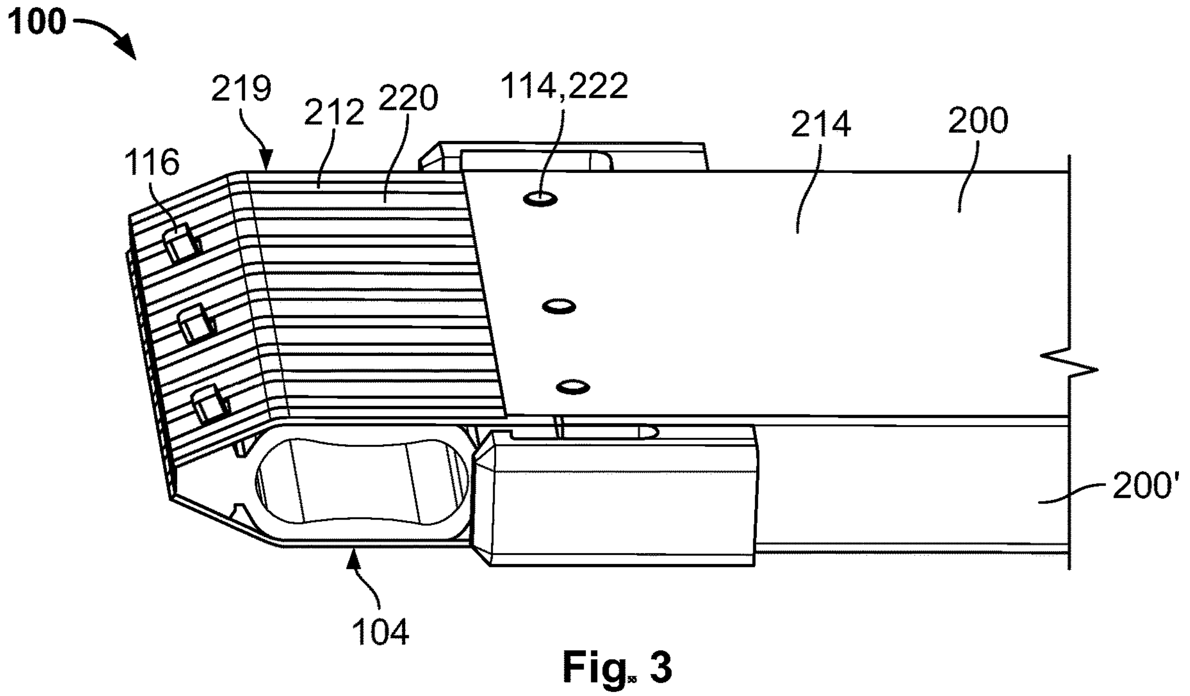
FIG. 3 is a perspective view of a cable assembly including the cable insertion device of the preceding figures having two FFCs attached thereto.

Cable locating elements or protrusions 114 (e.g., pegs) may be provided on a top side or wall and an identical bottom side or wall of the device 100 (with only the top of the device visible in the figures). The cable locating elements 114 are adapted to engage with and securely locate an FFC on each side of the device 100, as shown in FIG. 3. In the exemplary embodiment addition cable locating elements 116 (e.g., protrusions or pegs) are formed on the front or insertion end of the device 100. Specifically, the insertion end may be tapered to facilitate insertion into a connector. The locating elements 116 are formed on tapered surfaces 118 defining the insertion end.

The elastic section 104, which may also be referred to herein as a spring or compressible section, may be defined by a void space 106 formed through the body between upper and lower walls 108,110. As shown in FIGS. 1 and 2, exterior (i.e., outward facing) surfaces of the walls 108,110 may be generally flat or planar in the area of the void space 106 (i.e., above and below the void space 106). The elastic section 104 is adapted to be elastic in that the upper and lower walls 108,110 may be resiliently biased inward toward a center of the void space 106. Resiliency of the device 100 in any desired area may also be achieved without the formation of one or more void spaces, for example, by material choice alone.

Referring now to FIG. 3, a cable assembly is shown including a first FFC 200 and a second FFC 200' attached to respective top and bottom sides of the device 100 via the above-described locating elements 114,116. Generally, the exemplary FFCs 200,200' include a plurality of conductors 212 embedded within an insulation material 214. The conductors 212 may comprise metallic sheet or foil, such as copper or aluminum foil, by way of example only, patterned in any desirable configuration. The insulation material 214, such as a polymer insulation material, may be applied to either side of the conductors 212 via an adhesive, resulting in an embedded conductor arrangement. One or more portions or windows of the insulation material 214 may be removed (or may not be initially applied) in select areas to expose sections of the otherwise embedded conductors 212. In the exemplary embodiment, a portion or an area 219 of the insulation material 214 has been removed to define a single continuous window exposing at least the top sides of the conductors 212, while a bottom portion 220 of the insulation material remains present for added strength and stability. As shown, the area 219 in which the conductors 212 of the FFCs 200,200' have been exposed correspond in location to the elastic section 104 of the device 100.

A plurality of openings 222 are formed through the FFCs 200,200' between adjacent conductors 212. The openings 222 are sized and positioned to receive the locating elements 114,116. While in the illustrated embodiment the locating elements 114,116 are inserted through pre-formed openings 222 in the insulation material 214 of the FFCs 200,200', in other embodiments the locating elements may be sharpened so as to enable puncturing of the insulation material during installation.

Still referring to FIG. 3, the latches 112,113 of the device 100 define raised sides extending vertically above the FFCs 200,200'. In this way, the latches 112,113 define guides, centering the FFCs 200,200' on the device 100. Moreover, with reference again to FIGS. 1 and 2, each of the corners of the top and bottom surfaces of the device 100 which interface with the FFCs 200,200' are rounded, thus ensuring no damage (e.g., folding) to the FFCs during installation or use. This includes the edges of the elastic section 104, as well as the initial lead-in to the latching section 102, as is shown in FIG. 1.

Figure 4:
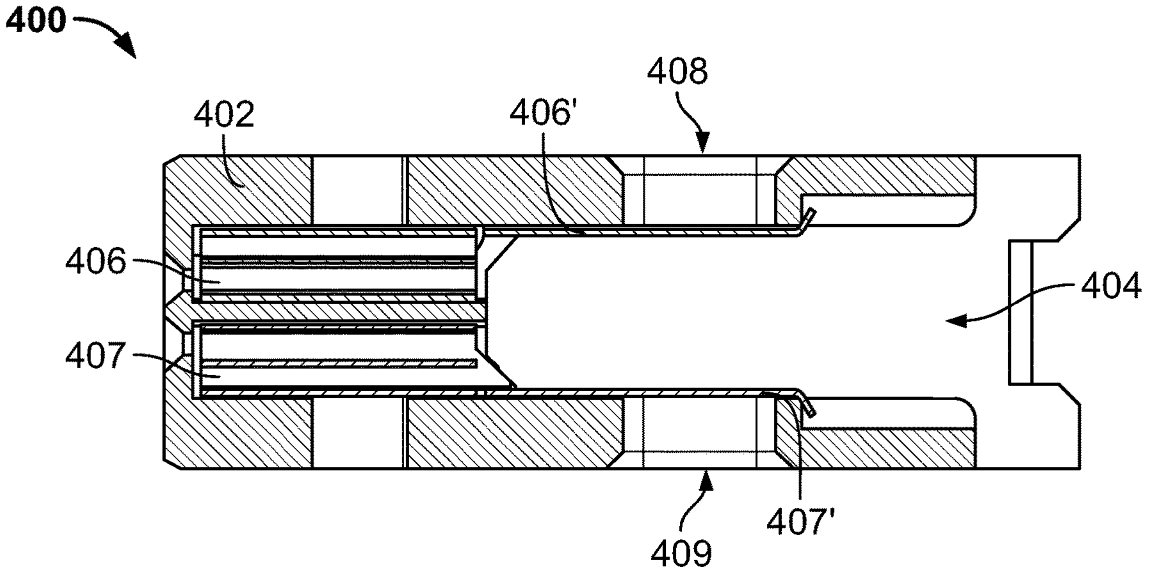
FIG. 4 is a side cross-sectional view of a connector suitable for use with the cable insertion device of FIGS. 1-3.

With reference to FIG. 4, an exemplary connector 400 mateable with the above-described insertion device 100 and FFCs 200,200' is shown. The connector 400 includes a housing 402 defining an open end in communication with a cable space 404, and a plurality of conductive terminals. Specifically, two exemplary conductive terminals 406,407 are illustrated in the cross-sectional view, although more terminals may be present. The terminals 406,407 may be installed within the housing 402 via, for example, locking lances. Each terminal 406,407 defines a contact surface or contact end 406',407' extending into the cable space 404. More specifically, the exposed contact ends 406',407' arranged along respective top and bottom internal walls of the housing 402 defining the cable space 404. Through openings 408,409, or weld windows, are formed through the top and bottom walls of the housing 402 in the area of the contact ends 406',407', thereby exposing the contact ends for future welding operations. In this way, each contact end 406',407' defines exposed conductive contact surfaces on either side thereof (i.e., on opposite top and bottom sides in FIG. 4).

Figure 5:
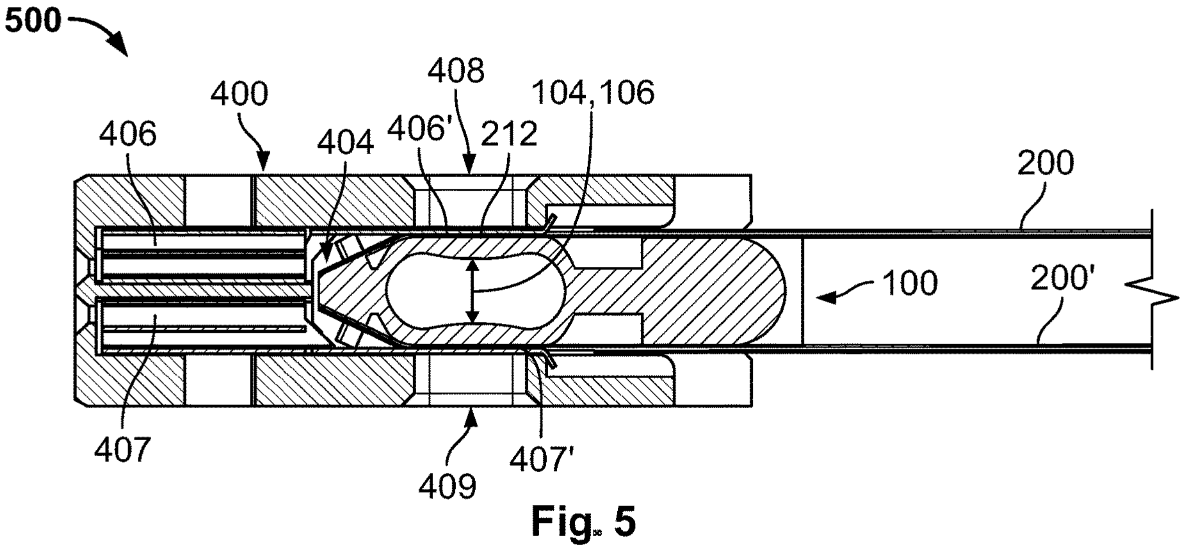
FIG. 5 is a side cross-sectional view of an assembly including the cable assembly of FIG. 3 installed within the connector of FIG. 4.

As shown in FIG. 5, a connector assembly 500 includes the insertion device 100 and FFCs 200,200' in an installed or inserted position within the connector 400. Specifically, the cable insertion device 100 has been inserted into the cable space 404 of the connector 400, and the exposed conductors 212 of the FFCs 200,200' moved into conducive contact with the terminals 406,407. In one embodiment, the elastic section 104 of the device 100 is slightly over-sized in a vertical direction such that it is compressed during an insertion operation. In the installed position shown, the openings 408,409 are generally aligned with the elastic section 104, as well as the contact ends 406',407' of each terminal 406,407. The elastic section 104 generates upward and downward forces on the FFCs 200,200', ensuring strong conductive contact between the exposed conductors 212 of the FFCs and inward facing contact surfaces of the contact ends 406',407'. These compressive forces ensure that no gaps exist between the conductive surfaces of the components during, for example, welding operations performed through the openings 408,409.

Figure 6:
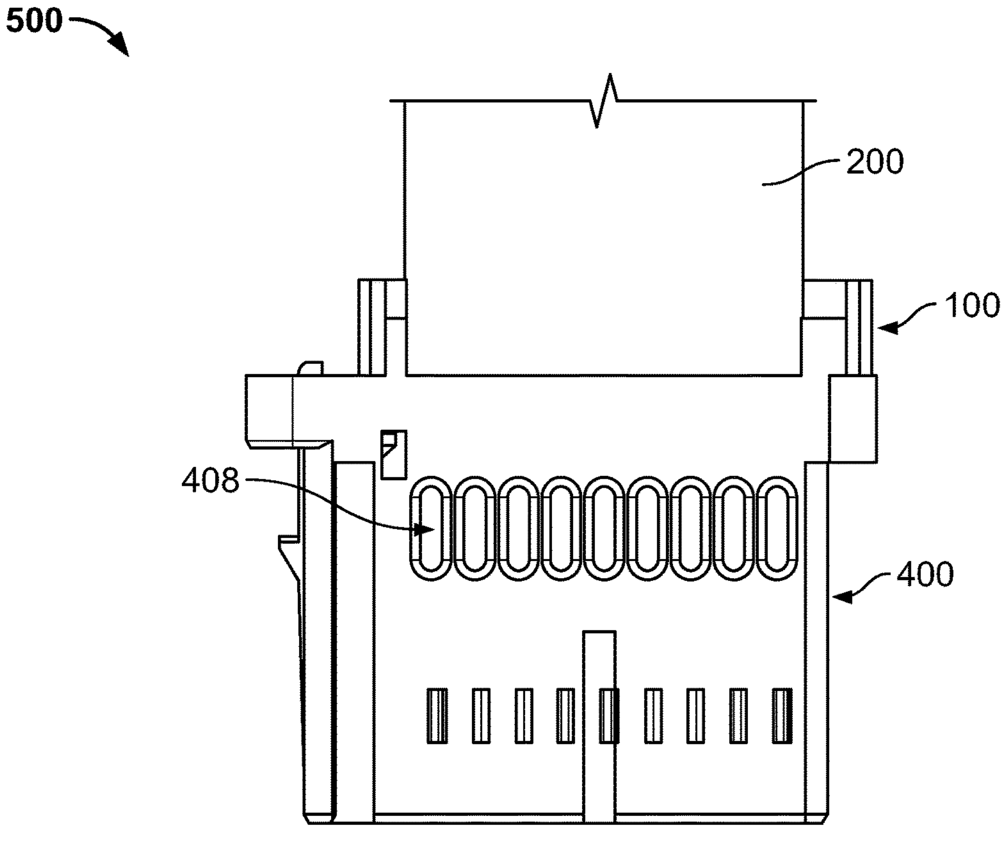
FIG. 6 is a top view of the assembly of FIG. 5.
Figure 7:
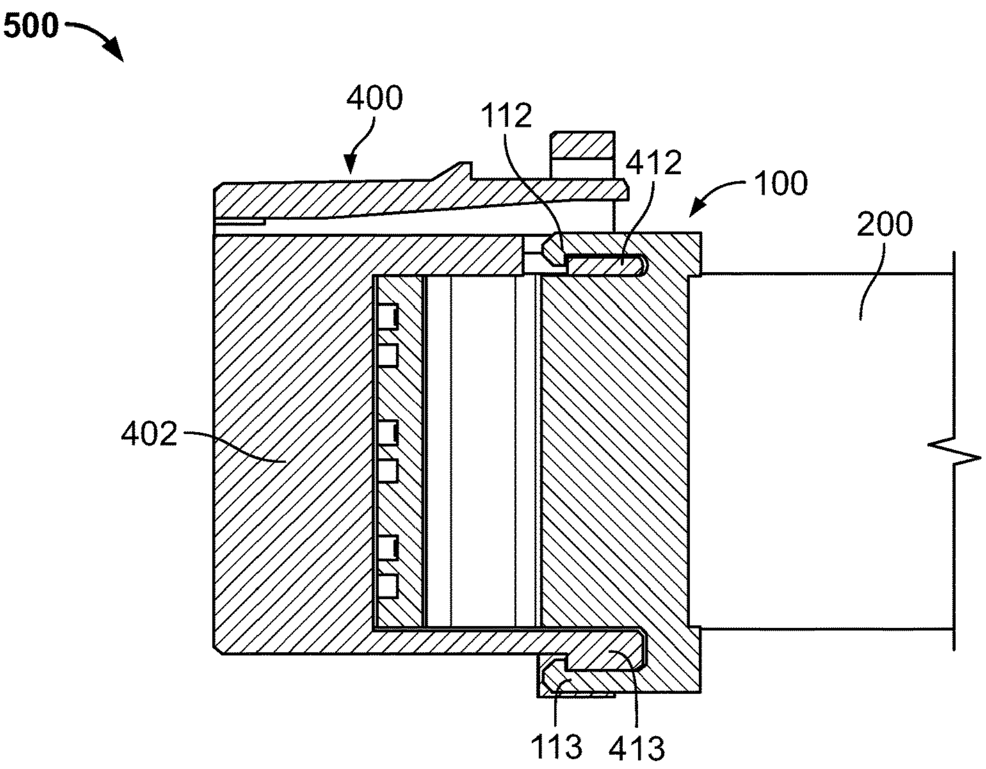
FIG. 7 is a cross-sectional view of the assembly of FIG. 5.

FIG. 6 is a top view of the assembly 500, and illustrates the plurality of openings 408 formed through the top side of the connector assembly. The bottom of the connector assembly 500 would, in one embodiment, show a similar arrangement of openings. The cross-section of FIG. 7 illustrated the exemplary latching arrangement between the insertion device 100 and the connector 400. As shown, the latches 112,113 of the device 100 engage with corresponding catches 412,413 defined by the housing 402. The latches 112,113 may also serve as mechanical stops, setting the insertion depth (and thus the installed position) of the device 100 into the connector 400. In a preferred embodiment, the front end of the cable insertion device 100 does not contact the housing 402 in the installed position.

Figure 8:
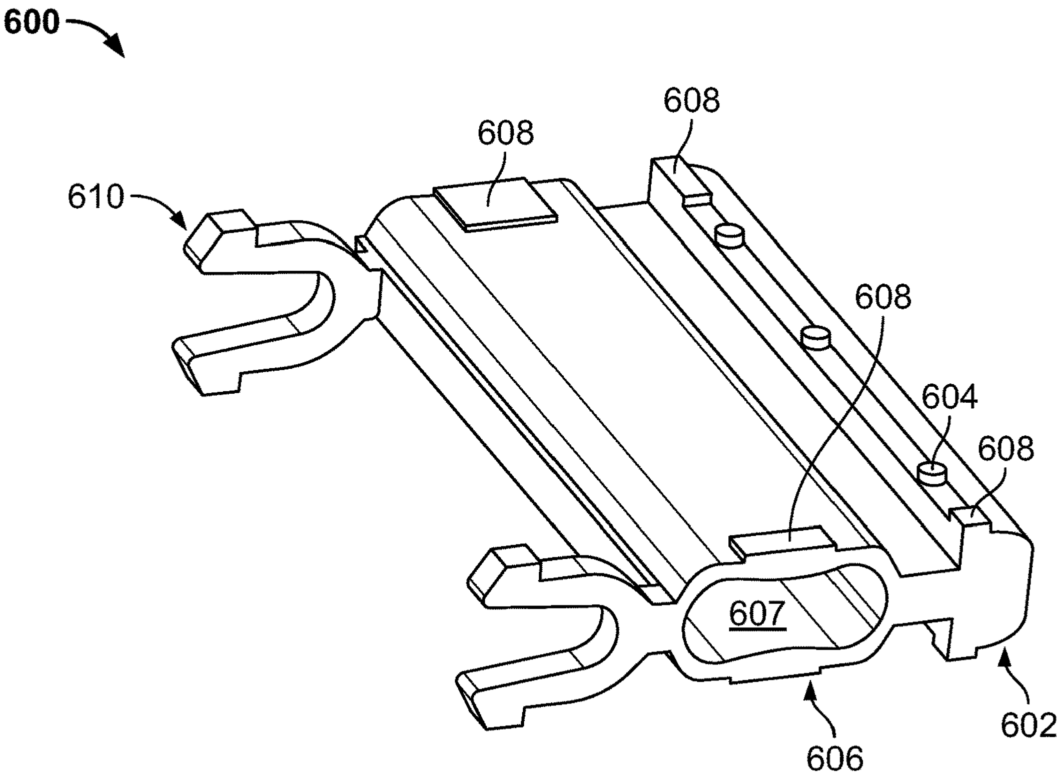
FIG. 8 is a perspective view of a cable insertion device according to another embodiment of the present disclosure.
Figure 9:
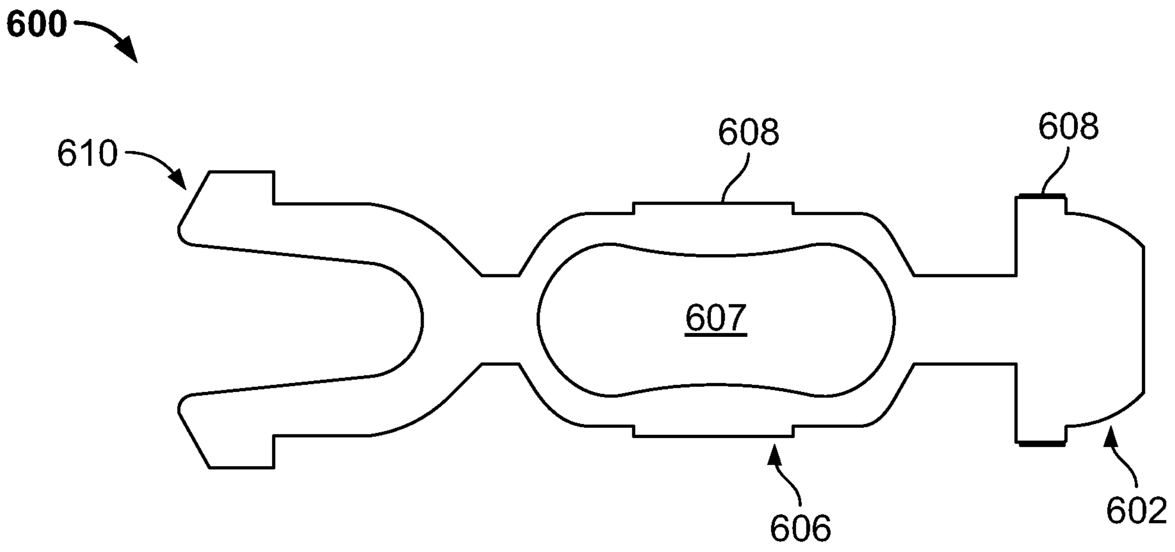
FIG. 9 is a side view of the insertion device of FIG. 8.

Referring now to FIGS. 8 and 9, another embodiment of a cable insertion device 600 is shown. As with the device 100, the device 600 includes a cable latching or locating section 602, including a plurality of locating elements or protrusions 604. An elastic or spring section 606 is formed via a void space 607 extending through the body of the device 600. Cable guides 608 are arranged on either lateral side of the top and bottom surfaces of the walls defining the elastic section 606. The cable guides 608 make the form of elevated walls or protrusions which are sized and located to position the cable on the device 600. As shown, the cable guides 608 may be of differing lengths on either lateral side, or otherwise positioned asymmetrically to offset a cable from a central position on the device 600 depending on the application. Latches 610, each in the form of a pair of elastic arms, are provided on each lateral side of the device 600, and serve to secure the device 600 within a connector housing. Additional features of the device 600 are shared with the device 100, such as planar surfaces above and below the elastic section 606, as well as rounded contours beneath the sections of the device 600 in contact with the FFCs, the details of which have not been repeated herein in the interest of brevity.

Figure 10:
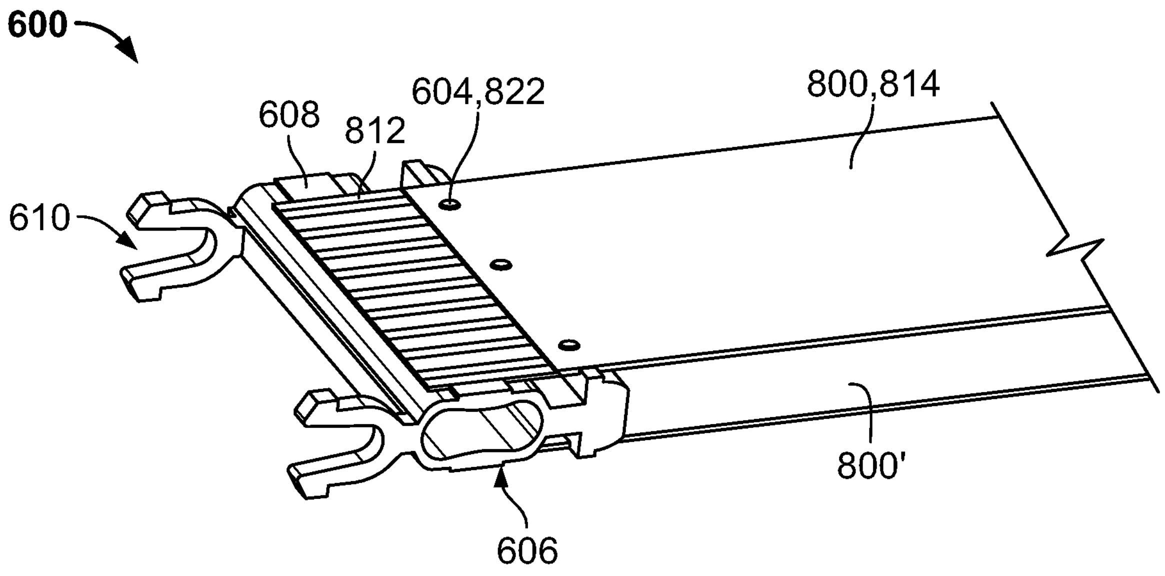
FIG. 10 is a perspective view of a cable assembly including the cable insertion device of FIGS. 8 and 9 having two FFCs attached thereto.

FIG. 10 illustrates a cable assembly including the device 600 having FFCs 800,800' positioned thereon via the locating elements 604 engagement with pre-formed holes 822 in the FFC 200. As set forth above, both above and below the elastic section 606, a portion of the insulation material 814 of the FFCs 800,800' has been removed in order to expose the conductors 812. As distinct from the embodiment of FIGS. 1-7, no cable locating elements are found on a forward or insertion end of the device 600, although such elements may be present without departing from the scope of the present disclosure.

Figure 11:
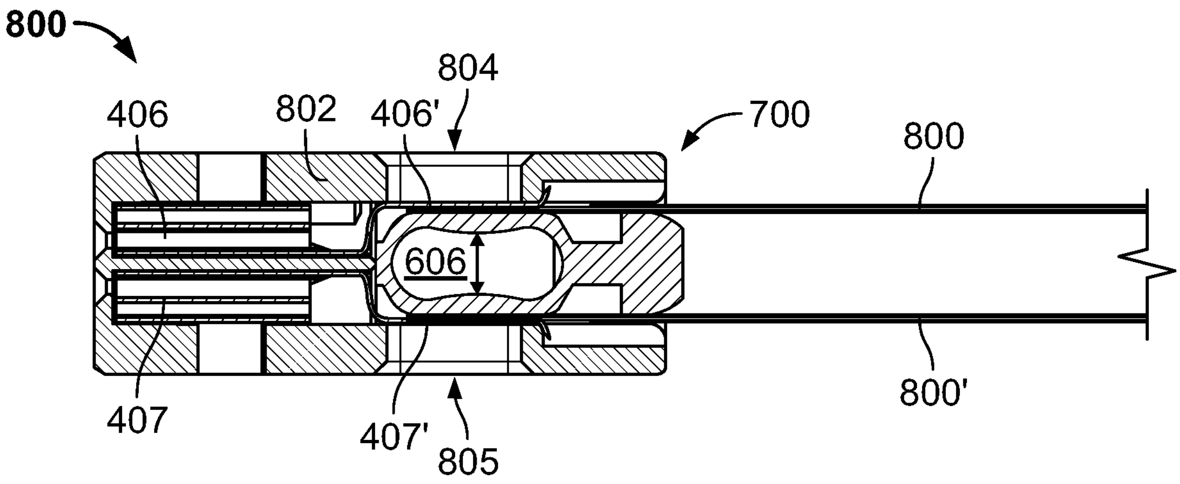
FIG. 11 is a side cross-sectional view of an assembly including the cable assembly of FIG. 10 installed within a connector.
Figure 12:
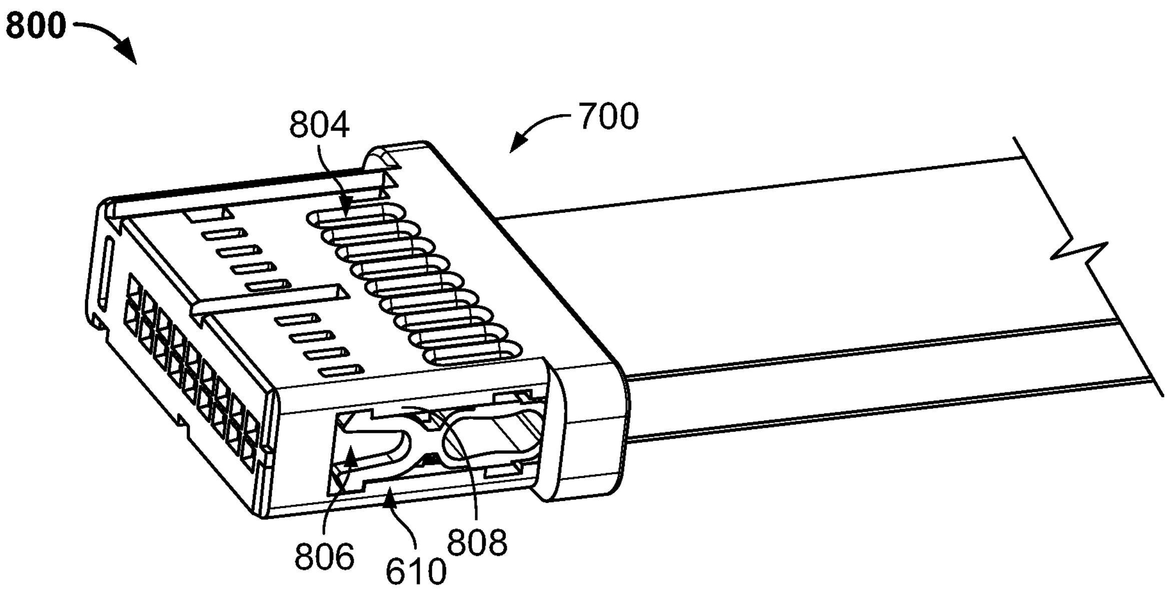
FIG. 12 is a side perspective view of the assembly of FIG. 11.

As shown in FIG. 11, a connector assembly 700 includes the device 600 and FFCs 800,800' installed into a connector 800. The assembly 700 has features similar to those set forth above regarding the assembly 500. Specifically, the elastic section 606 applies an outward force on the undersides of each FFC 800,800', urging the exposed conductors 812 into conductive contact with inward facing sides of the contact ends 406',407' of the terminals 406,407. In the illustrated installed position, the elastic section 606 is aligned with weld openings 804,805 formed through top and bottom walls of a housing 802 of the connector 800. The completed assembly 700 is shown again in FIG. 12, with the latches 610 being arranged in recessed channels 806 formed into lateral sides of the housing 802. The latches 610 are engaged with corresponding catches 808 defined by the housing 802, securing the device 600 within the connector 800.

It should be understood that embodiments of the present disclosure may be used for many types of wire or cable beyond the above-described FFCs. By way of example, embodiments are also useful for flat printed cables (FPCs), or even variants of round-wire cables, without departing from the scope of the present disclosure.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector assembly, comprising:

a connector body defining an opening in communication with a cable space, the connector body including conductive contact surfaces located on opposing sides of the cable space;

a cable insertion device insertable into the cable space via the opening, including:

a body defining an elastic section;

a first cable locating element arranged on a first side of the device body; and a second cable locating element arranged on a second side of the device body;

a first flat flexible cable (FFC) positioned on the first side of the device body by the first cable locating element; and a second FFC positioned on the second side of the device body by the second cable locating element.

2. The assembly of claim 1, wherein in an installed position within the cable space, the elastic section of the device is aligned with the conductive contact surfaces on each of the opposing sides of the cable space of the connector body, and is at least partially compressed between the conductive contact surfaces.

3. The assembly of claim 2, wherein a portion of the first FFC has an at least partially exposed conductor arranged over the elastic section and facing away from the first side of the device body, and a portion of the second FFC has an at least partially exposed conductor arranged over the elastic section and facing away from the second side of the device body.

4. The assembly of claim 3, wherein, with the device in the installed position within the cable space, the elastic section is compressed such that the exposed conductor of the first FFC is biased into contact with one of the conductive contact surfaces by the elastic section, and the exposed conductor of the second FFC is biased into contact with another one of the conductive contact surfaces by the elastic section.

5. The assembly of claim 2, wherein the connector body defines a through opening on each of two opposing sidewalls defining the cable space, each through opening exposing one of the conductive contact surfaces through the connector body.

6. The assembly of claim 5, wherein in the installed position of the device, the elastic section of the device is aligned with the openings formed through the connector body and the conductive contact surfaces.

7. The assembly of claim 1, wherein the elastic section is defined by a void space formed between the first side and the second side of the device body.

8. The assembly of claim 1, wherein the conductive contact surfaces are defined by electrical terminals housed in the connector body, the contact surfaces sized and located to be mated to exposed conductors of flat flexible cables.

9. The assembly of claim 1, wherein the device body further defines lateral guides sized and located to center a flat flexible cable on each of the first and second sides of the device body.

10. The assembly of claim 1, wherein the first cable locating element comprises a first protrusion located on the first side of the elastic section and a second protrusion located on a second side of the elastic section, opposite the first side in a direction of insertion of the device into the connector body.

11. The assembly of claim 1, wherein the cable insertion device further includes one of a latch or a catch securing the device to the connector body in the installed position.

12. A cable insertion device, comprising:

a body defining an elastic section;

a first cable locating element arranged on a first side of the body;

a second cable locating element arranged on a second side of the body, opposite the first side;

a connecting element adapted to secure the device to an associated connector;

a first flat flexible cable (FFC) attached to the first side of the body by the first cable locating element; and a second FFC attached to the second side of the body by the second cable locating element.

13. The device of claim 12, wherein the elastic section is defined by a void space defined between the first side and the second side of the body.

14. The device of claim 12, wherein the body further defines lateral guides sized and located to center the first and second FFCs on each of the first and second sides of the body.

15. The device of claim 12, wherein:

the first cable locating element includes a first protrusion located on a first side of the elastic section and a second protrusion located on a second side of the at least one elastic section, opposite the first side in a longitudinal direction of the device; and the second cable locating element includes a first protrusion located on a first side of the elastic section and a second protrusion located on a second side of the at least one elastic section, opposite the first side in the longitudinal direction of the device.

16. The device of claim 12, wherein exterior surfaces of the first and second sides of the body are generally planar at least in the area of the elastic section.

17. The device of claim 12, wherein the connecting element comprises at least one latch.

18. The device of claim 12, wherein the first and second cable locating elements are positioned on respective opposite tapered sides of a front end of the body.

19. The device of claim 12, wherein the body is monolithically formed of a non-conductive material.

20. The device of claim 12, wherein a portion of the first FFC has an at least partially exposed conductor arranged over the elastic section and facing away from the first side of the body, and a portion of the second FFC has an at least partially exposed conductor arranged over the elastic section and facing away from the second side of the body.

21. A connector assembly, comprising:

a connector body defining an opening in communication with a cable space, the connector body including conductive contact surfaces located on opposing sides of the cable space, the connector body defines a through opening on each of two opposing sidewalls defining the cable space, each through opening exposing one of the conductive contact surfaces through the connector body; and a cable insertion device insertable into the cable space via the opening, including:

a body defining an elastic section;

a first cable locating element arranged on a first side of the device body; and a second cable locating element arranged on a second side of the device body.

22. A connector assembly, comprising:

a connector body defining an opening in communication with a cable space, the connector body including conductive contact surfaces located on opposing sides of the cable space; and a cable insertion device insertable into the cable space via the opening, including:

a body defining an elastic section;

a first cable locating element arranged on a first side of the device body, the first cable locating element comprises a first protrusion located on the first side of the elastic section and a second protrusion located on a second side of the elastic section, opposite the first side in a direction of insertion of the device into the connector body; and a second cable locating element arranged on a second side of the device body.

23. A cable insertion device, comprising:

a body defining an elastic section;

a first cable locating element arranged on a first side of the body and adapted to locate a first flat flexible cable (FFC) on the first side of the body, the first cable locating element includes a first protrusion located on a first side of the elastic section and a second protrusion located on a second side of the at least one elastic section, opposite the first side in a longitudinal direction of the device;

a second cable locating element arranged on a second side of the body, opposite the first side, and adapted to locate a second FFC on the second side of the body; and a connecting element adapted to secure the device to an associated connector.

* * * * *